(12) United States Patent
Pattok

(10) Patent No.: US 6,318,494 B1
(45) Date of Patent: Nov. 20, 2001

(54) SELF-LOCKING DRAG LINK FOR STEER-BY-WIRE SYSTEM

(75) Inventor: Eric David Pattok, Wiesbaden (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/662,646

(22) Filed: Sep. 15, 2000

(30) Foreign Application Priority Data

Sep. 17, 1999 (GB) .................................................. 9921993

(51) Int. Cl.[7] ........................................................ B62D 5/04
(52) U.S. Cl. ............................................. 180/402; 180/444
(58) Field of Search .................................... 180/443, 444, 180/445, 446, 402, 407, 412, 413, 411, 435, 436, 403, 404

(56) References Cited

U.S. PATENT DOCUMENTS

| | | | |
|---|---|---|---|
| 4,741,409 | * | 5/1988 | Westercamp et al. . |
| 5,002,142 | * | 3/1991 | Klosterhaus . |
| 5,289,891 | * | 3/1994 | Sugiyama . |
| 5,323,866 | * | 6/1994 | Simard et al. . |
| 6,176,341 | * | 1/2001 | Ansari . |

* cited by examiner

*Primary Examiner*—Anne Marie Boehler
(74) *Attorney, Agent, or Firm*—Edmund P. Anderson

(57) ABSTRACT

A drag link (26) for a steer-by-wire system (10) in a motor vehicle in which the steer-by-wire system has a separate electrical actuator (20,24) for each front wheel (12,14) of the motor vehicle, the drag link comprising a first rod (30) connectable with one of the electrical actuators; a second rod (28) connectable with the other of the electrical actuators; and a locking device (32) connecting the first and second rods; wherein the first and second rods are substantially axially aligned on a common axis (A) at the locking device; wherein the locking device includes a housing member (38) having an internal surface (44) defining a bore (36) with an axis aligned with the common axis, a piston member (34) positioned in the bore in sliding engagement with the internal surface, and lock means (46) having a de-actuated state in which the piston member can move in the axial direction relative to the housing member, and an actuated state in which the piston member and the housing member are locked together; wherein the housing member is secured to the first rod; wherein the piston member is secured to the second rod; and wherein the lock means is actuated when the piston member moves in the axial direction relative to the housing member a distance greater than a predetermined distance (X) from a central position. Failure of one of the electrical actuators actuates the lock means so that one actuator will steer both wheels.

23 Claims, 2 Drawing Sheets

SELF-LOCKING DRAG LINK FOR STEER-BY-WIRE SYSTEM

CROSS-REFERENCE TO RELATED APPLICATIONS

This patent application claims priority to British Patent Application Number GB 9921993.3, filed on Sep. 17, 1999, which is hereby incorporated by reference in its entirety.

TECHNICAL FIELD

The present invention relates to a self-locking drag link for a steer-by-wire system in a motor vehicle, and to a steer-by-wire system incorporating such a self-locking drag link.

BACKGROUND OF THE INVENTION

There is a proposal to provide a steer-by-wire system in a motor vehicle in which the system comprises an electrical actuator associated with the steering knuckle at each front wheel of the vehicle.

SUMMARY OF THE INVENTION

The object of the present invention is to provide a mechanical link between the two electrical actuators so that, should one of the actuators fail, the remaining actuator will provide steering for both wheels.

In the present invention, a failure of one of the electrical actuators will result in the piston member moving (relative to the housing member) beyond the normal range of movement (when both actuators are functioning correctly). The excessive movement of the piston member actuates the lock means to cause the piston member and the housing member to become locked together.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
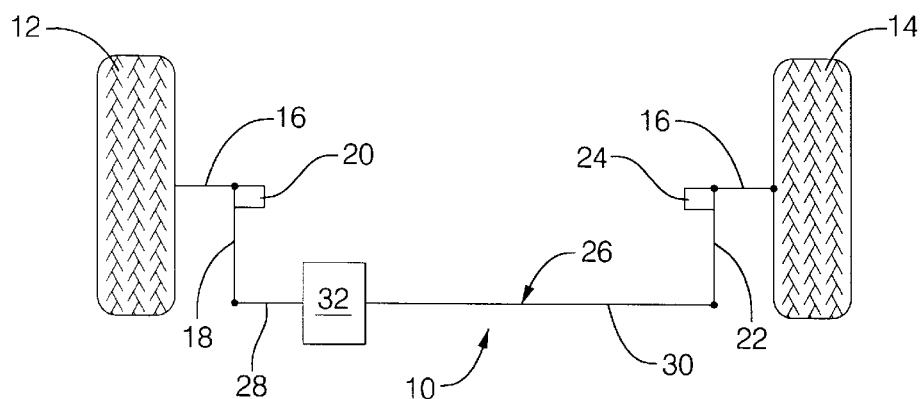
FIG. 1 is a schematic diagram of a steer-by-wire system in accordance with the present invention having a self-locking drag link in accordance with the present invention.

Referring to the drawings, the steer-by-wire system 10 is for use with a motor vehicle having left and right front wheels 12,14, respectively, each rotatably mounted on a king pin 16. The steer-by-wire system 10 comprises a steering knuckle 18 and an electrical actuator 20 for the left wheel 12, and a steering knuckle 22 and an electrical actuator 24 for the right wheel 14. The left and right steering knuckles 18,22 are mechanically linked by a drag link 26. The drag link 26 comprises a left rod 28 (which is connected to the left knuckle 18), a right rod 30 (which is connected to the right knuckle 22), and a self-locking device 32 connecting the left and right rods. The left and right rods 28,30 are substantially axially aligned with a common axis A at the self-locking device 32.

The self-locking device 32 comprises a piston member 34 which makes a sliding fit in a bore 36 formed in a housing member 38. The bore 36 has an axis aligned with the axis A. The piston member 34 has a pair of radially extending flanges 40 which are axially spaced apart to define a channel 42 therebetween extending around the circumference of the piston member. A groove 43 is formed in the channel 42 and extends around the circumference of the piston member 34. The flanges 40 makes a sliding fit with the surface 44 of the bore 36. The surface 44 of the bore 36 has a slot 46 formed therein which extends around the piston 34 adjacent the channel 42. The slot 46 and the groove 43 have substantially the same axial dimension. A pre-loaded snap ring 48 is positioned in the slot 46 and is normally retained in place by a rigid annular member 50 which engages the surface 44 of the bore 36 and which is located in the channel 42 between the flanges 40 and radially spaced from the groove 43. The bore 36 has an open end 52 defined by an inwardly extending, annular, lip 54 integral with the housing member 38, and a closed end 56 defined by an end wall 58 of the housing member. The end wall 58 of the housing member 38 is secured to the right rod 30. The left rod 28 extends past the lip 54 into the bore 36 and is secured to the piston member 34. The connection of the left and right rods 28,30 to the self-locking device 32 may be reversed.

Figure 2:
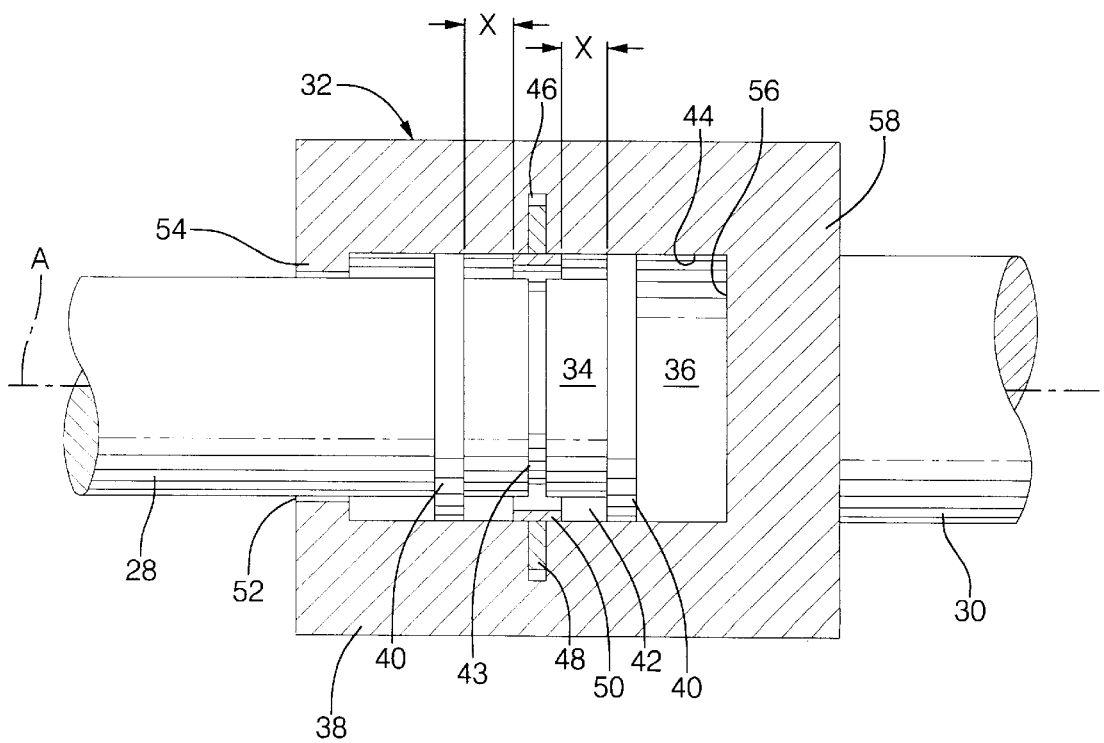
FIG. 2 is a cross-sectional view of the self-locking device of FIG. 1 during normal operation of the steer-by-wire system.

During normal operation of the steer-by-wire system 10, the electrical actuators 20,24 will independently steer the wheels 12,14, and the left rod 28 will move relative to the right rod 30 along the axis A. This relative movement will cause the piston member 34 to slide in the bore 36. The normal maximum stroke X (FIG. 2) of the piston member 34 from a central position (achieved during substantially straight line motion of the motor vehicle) will bring one of the flanges 40 into contact with the annular member 50 without moving the annular member 50 (which is held in place by the snap ring 48).

Figure 3:
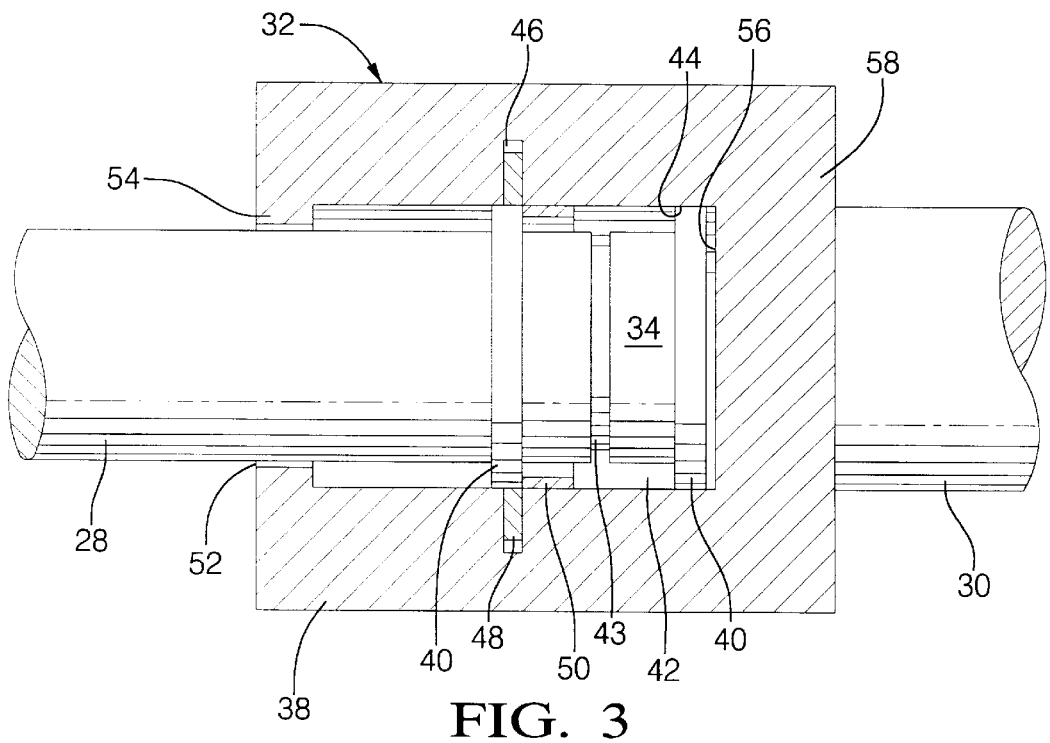
FIG. 3 is a cross-sectional view of the self-locking device of FIG. 2 when initially triggered for operation.

Should, the left actuator 20 fail for any reason, steering of the right wheel 14 by the right actuator 24 will cause the piston member 34 to slide in the bore 36 towards the closed end 56 of the bore, beyond the normal maximum stroke X. Such excessive movement of the piston member 34 will cause one of the flanges 40 to push the annular member 50 along the surface 44 of the bore 36, and bring the snap ring 48 into engagement with that flange, as shown in FIG. 3. The engagement of the snap ring 48 with the flange 40 provides damping for the steering action.

Figure 4:
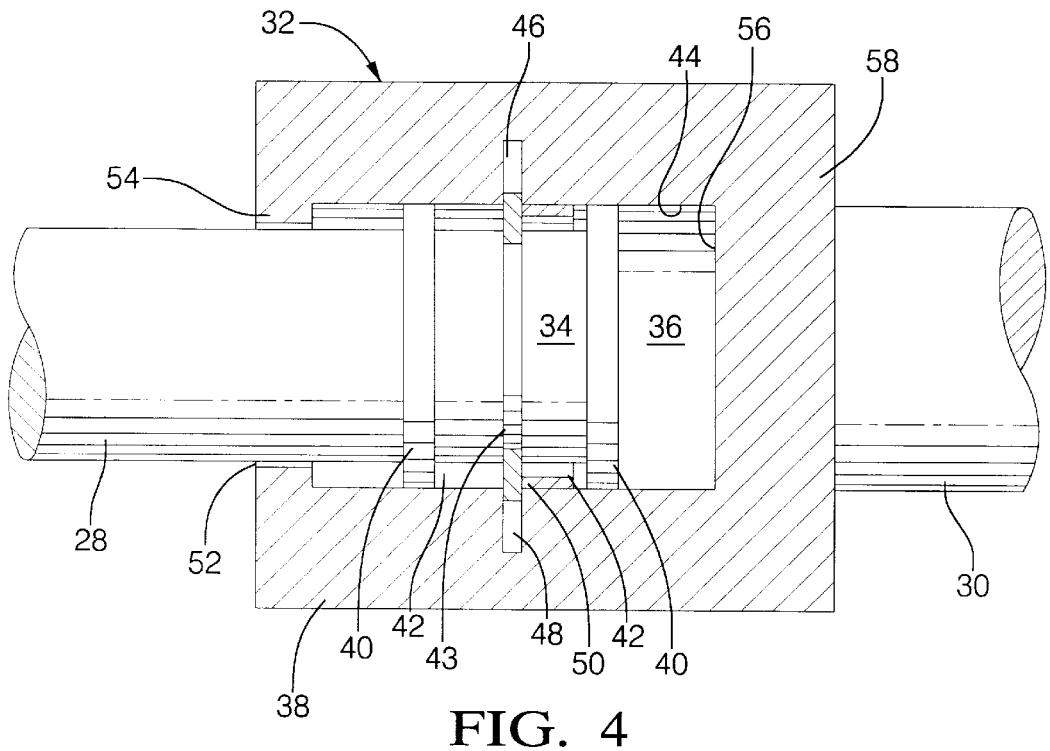
FIG. 4 is a cross-sectional view of the self-locking device of FIG. 3 after triggering and when locked.

When the right actuator 24 returns the right wheel 14 to straight line movement, the piston member 34 moves away from the closed end 56 of the bore 36. The snap ring 48 disengages from the flange 40 and snaps into the channel 42 between the flanges 40, and then into the groove 43, as shown in FIG. 4, to lock the piston member 34 in the bore 36. Such action prevents relative movement, along the axis A, between the left and right rods 28,30 of the drag link 26. Consequently, subsequent actuation of the right actuator 24 to steer the right wheel 14 will also steer the left wheel 12. The same effect will be achieved should the right actuator 24 fail but the left actuator 20 continue to operate.

The present invention therefore provides a steer-by-wire system which will continue to provide steering for both front wheels of the motor vehicle should one of the actuators fail.

What is claimed is:

1. A drag link for a steer-by-wire system in a motor vehicle in which the steer-by-wire system has a separate electrical actuator for each front wheel of the motor vehicle, the drag link comprising a first rod connectable with one of the electrical actuators; a second rod connectable with the other of the electrical actuators; and a locking device connecting the first and second rods; wherein the first and second rods are substantially axially aligned on a common axis at the locking device; wherein the locking device includes a housing member having an internal surface defining a bore with an axis aligned with the common axis, a piston member positioned in the bore in sliding engagement with the internal surface, and lock means having a de-actuated state in which the piston member can move in the axial direction relative to the housing member, and an actuated state in which the piston member and the housing member are locked together; wherein the housing member is secured to the first rod; wherein the piston member is secured to the second rod; and wherein the lock means is actuated when the piston member moves in the axial direction relative to the housing member a distance greater than a predetermined distance from a central position.

2. A drag link as claimed in claim 1, wherein the predetermined distance is the normal maximum stroke distance of the piston member relative to the housing member from the central position.

3. A drag link as claimed in claim 2, wherein the lock means comprises a pre-loaded snap ring positioned in an annular slot formed in the internal surface of the housing member, and an annular member engaging the internal surface and the snap ring in the de-actuate state of the lock means; and wherein the annular member is engaged by and moved by the piston member, when the piston member moves the distance greater than the predetermined distance, to release the snap ring and actuate the lock means.

4. A drag link as claimed in claim 1, wherein the lock means comprises a pre-loaded snap ring positioned in an annular slot formed in the internal surface of the housing member, and an annular member engaging the internal surface and the snap ring in the de-actuate state of the lock means; and wherein the annular member is engaged by and moved by the piston member, when the piston member moves the distance greater than the predetermined distance, to release the snap ring and actuate the lock means.

5. A drag link as claimed in claim 3, wherein, in the actuated state of the lock means, the snap ring engages in a circumferentially extending groove in the piston member.

6. A drag link as claimed in claim 5, wherein the piston member has a pair of radially extending axially spaced flanges slidingly engaging the internal surface of the housing member and defining a channel therebetween extending around the circumference of the piston member; and wherein the groove is formed in the channel.

7. A drag link as claimed in claim 3, wherein the groove and the slot are radially aligned when the piston member is in the central position.

8. A drag link as claimed in claim 4, wherein the groove and the slot are radially aligned when the piston member is in the central position.

9. A drag link as claimed in claim 1, wherein the housing member has an end wall closing one end of the bore; and wherein the other end of the bore is open and defined by an inwardly extending annular lip integral with the housing member.

10. A drag link as claimed in claim 2, wherein the housing member has an end wall closing one end of the bore; and wherein the other end of the bore is open and defined by an inwardly extending annular lip integral with the housing member.

11. A drag link as claimed in claim 3, wherein the housing member has an end wall closing one end of the bore; and wherein the other end of the bore is open and defined by an inwardly extending annular lip integral with the housing member.

12. A drag link as claimed in claim 4, wherein the housing member has an end wall closing one end of the bore; and wherein the other end of the bore is open and defined by an inwardly extending annular lip integral with the housing member.

13. A drag link as claimed in claim 5, wherein the housing member has an end wall closing one end of the bore; and wherein the other end of the bore is open and defined by an inwardly extending annular lip integral with the housing member.

14. A drag link as claimed in claim 6, wherein the housing member has an end wall closing one end of the bore; and wherein the other end of the bore is open and defined by an inwardly extending annular lip integral with the housing member.

15. A steer-by-wire system for a motor vehicle comprises a first steering knuckle and electrical actuator for one front wheel of the motor vehicle; a second steering knuckle and electrical actuator for the other front wheel of the motor vehicle; and a drag link connected between the first steering knuckle and electrical actuator and the second steering knuckle and electrical actuator, wherein the drag link comprises a first rod connectable with one of the electrical actuators; a second rod connectable with the other of the electrical actuators; and a locking device connecting the first and second rods.

16. The system as claimed in claim 15, wherein the first and second rods are substantially axially aligned on a common axis at the locking device; wherein the locking device includes a housing member having an internal surface defining a bore with an axis aligned with the common axis, a piston member positioned in the bore in sliding engagement with the internal surface, and lock means having a de-actuated state in which the piston member can move in the axial direction relative to the housing member, and an actuated state in which the piston member and the housing member are locked together; wherein the housing member is secured to the first rod; wherein the piston member is secured to the second rod; wherein the lock means is actuated when the piston member moves in the axial direction relative to the housing member a distance greater than predetermined distance from a central position; and wherein the predetermined distance is the normal maximum stroke distance of the piston member relative to the housing member from the central position.

17. The system as claimed in claim 16, wherein the lock means comprises a pre-loaded snap ring positioned in an annular slot formed in the internal surfaces of the housing member, and an annular member engaging the internal surface and the snap ring in the de-actuate state of the lock means; and wherein the annular member is engaged by and moved by the piston member, when the piston member moves the distance greater than the predetermined distance, to release the snap ring and actuate the lock means.

18. The system as claimed in claim 17, wherein, in the actuated state of the lock means, the snap ring engages in a circumferentially extending groove in the piston member.

19. The system as claimed in claim 18, wherein the piston member has a pair of radially extending axially spaced flanges slidingly engaging the internal surface of the housing member and defining a channel therebetween extending around the circumference of the piston member; and wherein the groove is formed in the channel.

20. The system as claimed in claim 16, wherein the lock means comprises a pre-loaded snap ring positioned in an annular slot formed in the internal surface of the housing member, and an annular member engaging the internal surface and the snap ring in the de-actuate state of the lock means; and wherein the annular member is engaged by and moved by the piston member, when the piston member moves the distance greater than the predetermined distance, to release the snap ring and actuate the lock means.

21. The system as claimed in claim 20, wherein, in the actuated state of the lock means, the snap ring engages in a circumferentially extending groove in the piston member.

22. The system as claimed in claim 21, wherein the piston member has a pair of radially extending axially spaced flanges slidingly engaging the internal surface of the housing member and defining a channel therebetween extending around the circumference of the piston member; and wherein the groove is formed in the channel.

23. The system as claimed in claim 22, wherein the groove and the slot are radially aligned when the piston member is in the central position.

* * * * *